V. F. PAVEY.
CORN PLANTER.
APPLICATION FILED JAN. 16, 1909.

939,159.

Patented Nov. 2, 1909.
2 SHEETS—SHEET 1.

Witnesses:
G. M. Gridley
A. Rager

Inventor.
Vernon F. Pavey.
Geo. W. Rightmire
Attorney.

V. F. PAVEY.
CORN PLANTER.
APPLICATION FILED JAN. 16, 1909.
939,159.
Patented Nov. 2, 1909.
2 SHEETS—SHEET 2.
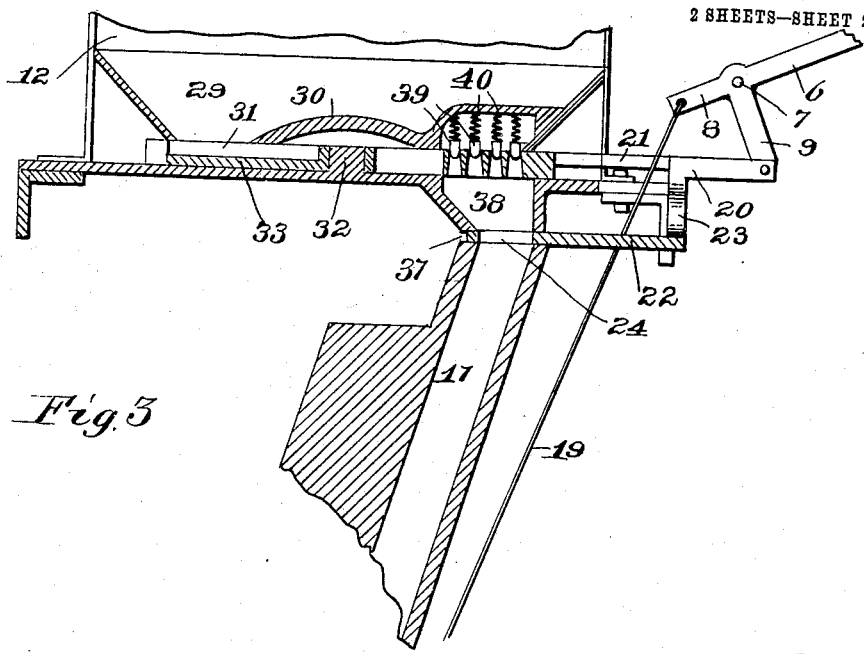
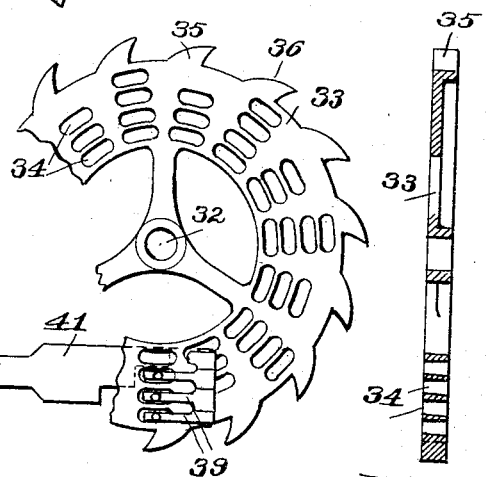
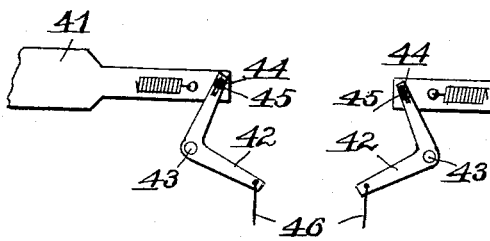
Witnesses:
G. M. Gridley
A. Rager
Inventor.
Vernon F. Pavey
Geo. W. Rightemire
Attorney.

UNITED STATES PATENT OFFICE.

VERNON F. PAVEY, OF LEESBURG, OHIO.

CORN-PLANTER.

939,159.  Specification of Letters Patent.  Patented Nov. 2, 1909.

Original application filed January 18, 1908, Serial No. 411,516. Divided and this application filed January 16, 1909. Serial No. 472,708.

*To all whom it may concern:*

Be it known that I, VERNON F. PAVEY, a citizen of the United States, residing at Leesburg, in the county of Highland and State of Ohio, have invented certain new and useful Improvements in Corn-Planters, of which the following is a specification.

My invention relates to improvements in corn planters and has for its especial object the provision of seed feeding devices. These devices are adapted to be operated by the rotation of the drive wheel, intermittently as desired, and are mounted upon the planter frame at appropriate points to be thus actuated.

The invention includes especially a seed disk with seed openings therein arranged to drop the corn edgewise; devices are provided for determining at will the number of grains which may be dropped at one time; intermittently reciprocating devices are provided for actuating the seed disk through the desired angle and for checking the same; further, devices are provided for forcing the grain out through the openings in the seed disk at the appropriate time. These and other features are hereinafter specifically set forth and their combinations are included in the claims.

I have not deemed it essential to show a complete corn planter, inasmuch as it will be understood by those skilled in the art how these devices are applicable to a corn planter and how they are operated; further, detailed constructions are also shown in my pending application, Serial Number 411,516, filed Jan. 18, 1908, from which the present application is divided, and to which reference is hereby made for further details of construction and operation.

Figure 1:
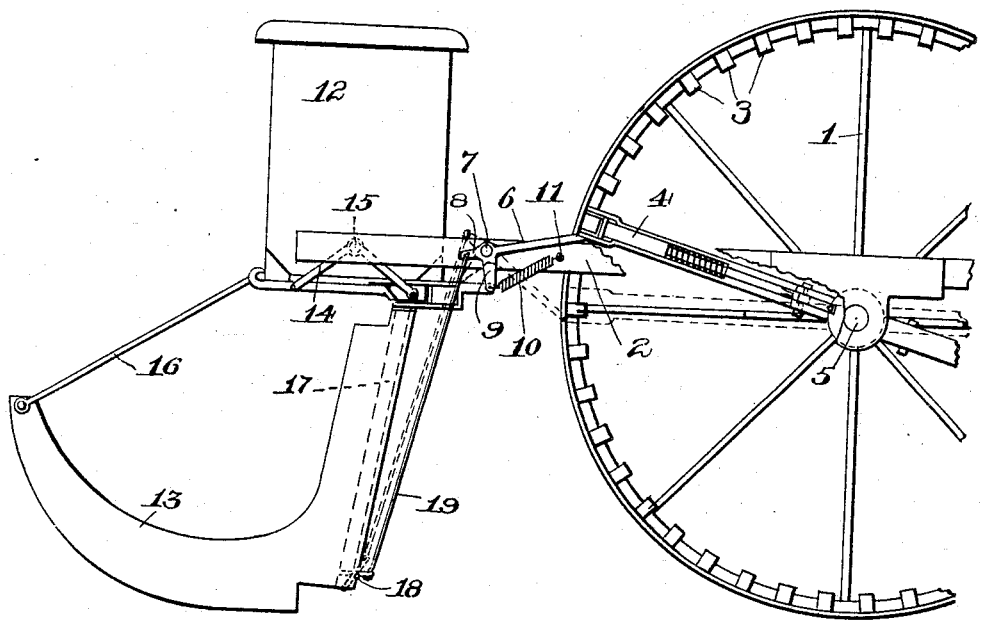
Figure 2:
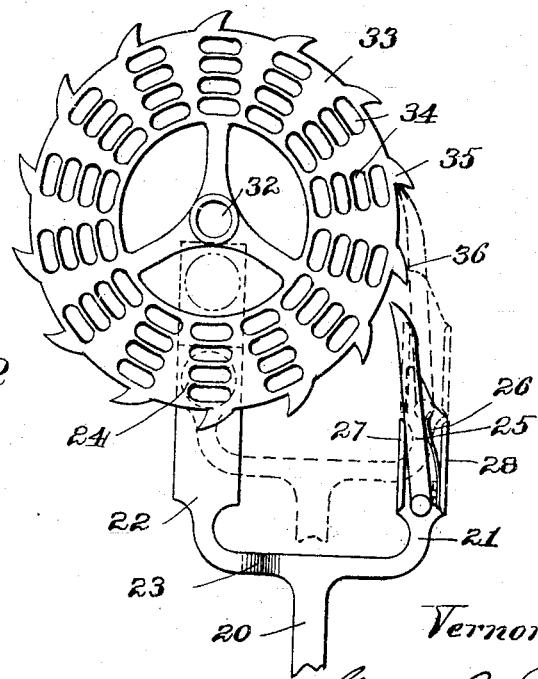

In the drawings which are hereto attached and hereby made a part of this specification, Figure 1 is a side elevation of the seed feeding device and the means of operating the same; Fig. 2 is a plan view of the seed disk and the actuating means therefor; Fig. 3 is a sectional elevation of the seed feeding devices; Fig. 4 shows the slide for determining the number of grains which may be dropped at one time; it also includes the grain ejectors; Fig. 5 is a section through the seed disk along the diameter thereof; Fig. 6 is a detail of the seed ejector.

In the drawings in which the same numeral indicates the same part throughout, 1 is one of the wheels of the corn planter supporting the planter frame 2, said wheel having arranged circumferentially thereon the lugs 3 adapted to engage with the tripping device 4 carried upon the axle 5 and adapted to be positioned at the appropriate lug 3 by means of a construction which is sufficiently described in the parent application. The tripping device 4 is adapted to engage the end of the bell crank 6, pivotally mounted at 7 upon the planter frame 2, and having the arms 8 and 9 thereon; the arm 9 has the spring 10 connected thereto, said spring being secured upon the planter frame 2 at 11, the function thereof being to return the arm 9 to normal position after the same has been actuated forwardly by the tripping device 4.

The seed box is shown at 12 mounted upon the planter frame, and a furrow opener 13 is carried thereon, supported thereon by means of the metallic hanger 14 secured at 15 upon the frame 2, and also by the hook rod 16. At its rear portion the furrow opener carries a seed dropping tube 17 which has mounted near its lower opening a valve 18, which is adapted to be manipulated by the rod 19 connected at its upper end to the arm 8 of the bell crank lever 6. It is seen that the valve 18 will be opened by the operation of the tripping device 4, the spring 10 acting to return the valves to a closed position by the pull it exercises upon the arm 9. The position of the bell crank lever 6 and the rod 19 and the valve 18 when actuated by the tripping device 4 is shown in dotted lines in Fig. 1.

Connected to the end of the arm 9, is the actuating plate 20, provided with the two arms 21 and 22; the latter is bent vertically as shown at 23, and has an opening 24 formed adjacent to its end through which the appropriate number of seeds may pass as will be hereinafter specifically set forth. The other arm 21 carries thereon a pivoted finger 25 against which the spring 26 acts to give the same an inward inclination, the limits of lateral movement of the finger being determined by the flanges 27 and 28 formed on the opposite sides of the arm 21. The purpose of this finger will be hereinafter set forth. The position of the actuating plate 20 when actuated by the dropping device 4 is shown in dotted lines in Fig. 2.

Referring to Fig. 3, the seed box 12 is seen to have a hopper form at its bottom as shown at 29, and in this hopper portion is mounted an irregularly shaped cover plate 30, so constructed that the seed in the box 12 will converge at the bottom, and will be directed into the open portion 31. Mounted on the short vertical shaft 32 on the planter frame 2 to rotate in a horizontal plane thereon is the seed disk 33 provided with the radial rows of perforations 34 arranged circumferentially. In Fig. 2, the seed disk is shown with four openings in each radial row, while in Fig. 4 alternate rows are shown with three openings in each; the openings are so arranged that the grain of corn will pass therethrough edgewise. The provision for dropping the grains edgewise has advantages over other forms of construction which are apparent to farmers and others skilled in the use of corn planters and in cultivation of grain, and need not therefore be further described.

The actuation of the disk 33 and the dropping of the seed therethrough is accomplished as follows: The actuating plate 20 being actuated by the dropping device as above described, the finger 25 is moved forwardly as shown in dotted lines in Fig. 2, and engages one of the teeth 35, thereby rotating the disk 33 through a short angle. The distance of rotation must be sufficient to bring a new row of openings 34 above the perforated slide 24. It is seen that the contact face of the teeth 35 is beveled, and the contact end of the finger 25 is also beveled, so that when these points are in engagement they resist a tendency on the part of the finger 25 to slide laterally and be released from engagement with the tooth. This tendency to lateral movement on the part of the finger 25 is due to the pressure thereon of the succeeding tooth, which bears against the finger as shown at 36 in Fig. 2. The end of the finger being in engagement with the face of the tooth 35, and the following tooth 36 being also in engagement with the finger, and slide resistance to the further rotation of the disk is set up, which checks the movement of the disk and thereby prevents a tendency thereof to overthrow, or pass too far for the proper delivery of the charge of grain through the disk on to the plate 22.

Plate 22 is provided with the opening 24, and the plate is adapted to be reciprocated through an opening 37, formed in the upper end of the seed tube 17, and when in its normal position, the charge delivered through the disk into the chamber 38 will pass through the opening 24 and drop down through the tube 17 upon the valve 18. In the position of the slide 22 shown in Fig. 2, in the dotted lines, the seed is delivered into the chamber 38, and when the slide is retracted by the spring 10, to the position shown in Fig. 3, the seed is free to pass downwardly to the valve 18. The operation of the seed disk and plate 22 and valve 18 is appropriately timed to accomplish the desired result.

The cover 30, as shown in Fig. 3, carries the seed ejectors 39 pressed upon by the springs 40, and positioned so as to enter the seed openings in the disk 33 when the said openings are brought to the proper point in the rotation of the disk. The action of the spring 40 is by expansion, and the tendency constantly is to force the ejectors downwardly. The seed enters the openings when the disk is exposed to the grain through the opening in the cover at 31, the formation of the seed box in its lower part being such as to direct the movement of the grain toward this point, as explained above. As the disk is rotated, the grain is brought into proper position to be engaged by the seed ejectors 39, the latter being in sliding contact with the face of the disk 33, and properly spaced to enter the seed openings therein.

When the disk is being actuated by the finger 25, the plate 22 is moved inwardly to such an extent that the opening 24 therein is out of register with the seed tube 17, and consequently no seed can pass at this time; upon the return of the plate 20, however, to its normal position, the registration is again effected, and the seed may be delivered to the lower end of the tube 17.

Under some conditions it is desirable to limit the number of grains forming the charge, and for this purpose I have shown in Fig. 4 a sliding plate 41 which is stepped adjacent to one end thereof, and is actuated by the bell crank 42 pivoted at 43, and slotted at one end 44 to receive a lug or bolt 45 carried on the slide 41. At the other end of the bell crank 42 is attached a rod 46 which is actuated with an appropriate lever (not shown), in easy reach of the operator, in a well understood manner. The plate 41 shown in Fig. 4 is so constructed that one of the seed openings in the disk 33 may be obstructed, or two, or three; the conditions usually found, however, would not require the obstruction of more than two of the openings, and generally not more than one would be out of use.

Reference is hereby made to the above mentioned parent application for other features of the construction connected with the features herein set out, it not being deemed essential to embody them in this divisional application; the features herein described relate especially to the seed feeding devices and means of operating the same.

What I claim is:

1. In a seed planter a seed receptacle, a disk rotatably mounted adjacent the lower end of said receptacle having a series of perforations therethrough arranged radially therein and adapted to receive the grain edgewise from said receptacle in said perforations, projections arranged upon the circumference of said disk, a bifurcated member mounted adjacent said seed receptacle, means for actuating said member to move one arm thereon in engagement with said disk to rotate the same and to move the other arm of said member into position to prevent the passage of grain through said perforations during said rotation of said disk.

2. In a seed planter a seed receptacle, a disk rotatably mounted in the lower portion of said receptacle and having a series of radial perforations therethrough adapted to receive the grain from said receptacle edgewise, projections upon the circumference of said disk, a bifurcated member mounted adjacent said disk and having one arm adapted to engage said projection at predetermined intervals to rotate said disk, and having a second arm provided with an opening therethrough for receiving the grain passing through said radial perforations.

3. In a seed planter a wheeled carriage having a frame thereon, a seed receptacle on said frame, a disk rotatably mounted in the lower portion of said receptacle having perforations therein arranged in radial rows for the passage of seed therethrough, a seed dropping tube arranged adjacent said disk, a bifurcated plate mounted on said frame having one arm thereof arranged to control the passage of grain into said tube, and the other arm thereof adapted to engage said disk, a bell crank lever mounted on said frame and connected with said bifurcated plate, an adjustable tripping device mounted on a wheel of said carriage adapted to be brought into engagement with said lever, whereby said bifurcated plate is moved to actuate said disk with one of its arms while the other arm is positioned to control the passage of grain into said tube.

4. In a seed planter, a disk rotatably mounted having perforations arranged radially, teeth formed on the circumference of said disk, a bifurcated plate having one of its arms underlying said disk and provided with an opening to register with perforations therein, a pivoted pawl mounted on the other arm, and means for intermittently actuating said plate to cause said pawl to advance said disk and at the same time to destroy the registration between said opening and said perforations.

5. In a seed planter, a seed receptacle, a disk rotatably mounted therein having perforations therethrough adapted to receive the seed from said receptacle, projections upon the circumference of said disk, a bifurcated member mounted adjacent to said disk and having one arm adapted to engage a projection at predetermined intervals to rotate said disk, and having a second arm provided with an opening therethrough for receiving the grain from said perforations.

In testimony whereof I affix my signature in the presence of two witnesses.

VERNON F. PAVEY.

Witnesses:
  I. E. DAVIS,
  C. E. PAVEY.